United States Patent [19]

Hwang

[11] Patent Number: 5,748,411
[45] Date of Patent: May 5, 1998

[54] HEAD DRUM ASSEMBLY OF A VIDEO CASSETTE RECORDER WITH AUDIO AND CONTROL HEADS MOUNTED ON UPPER AND LOWER STATIONARY DRUMS OF HEAD DRUM

[75] Inventor: Sung-Soo Hwang, Seoul, Rep. of Korea

[73] Assignee: Daewoo Electronics Co., Ltd., Rep. of Korea

[21] Appl. No.: 825,372

[22] Filed: Mar. 28, 1997

[30] Foreign Application Priority Data

Mar. 28, 1996 [KR] Rep. of Korea .................. 96-8778

[51] Int. Cl.[6] ...................................................... G11B 5/52
[52] U.S. Cl. ................................................................ 360/107
[58] Field of Search ............................ 360/107, 84–85

[56] References Cited

U.S. PATENT DOCUMENTS 4,535,367  8/1985  Kanda .

FOREIGN PATENT DOCUMENTS 57-40733  3/1982  Japan .

OTHER PUBLICATIONS

Japanese Abstract of Publication No. 57-092419, Section No. 141, vol. 06, No. 175, p. 117, dated Sep. 9, 1992.

Japanese Abstract of Publication No. 57-130225, Section No. 155, vol. 06, No. 229, p. 72, dated Nov. 16, 1982.

*Primary Examiner*—A. J. Heinz
*Attorney, Agent, or Firm*—Cushman Darby Cushman Intellectual Property Group of Pillsbury Madison & Sutro, LLP

[57] ABSTRACT

Disclosed is a head drum assembly of a video cassette recorder for simultaneously scanning an audio track, a control track and a video track of a magnetic tape. A stationary drum, a rotary drum and a fixed drum are provided. The stationary drum and the fixed drum are connected to each other on the same axial line. An audio head is installed at the outer periphery of the stationary drum with a predetermined angle. A control head is installed at the outer periphery of the fixed drum with the same angle. The structure of the running system of the video cassette recorder is simple.

2 Claims, 4 Drawing Sheets

«5,748,411»

HEAD DRUM ASSEMBLY OF A VIDEO CASSETTE RECORDER WITH AUDIO AND CONTROL HEADS MOUNTED ON UPPER AND LOWER STATIONARY DRUMS OF HEAD DRUM

BACKGROUND OF THE INVENTION

1. Field of the Invention

The present invention relates to a video tape recorder, and more particularly to a rotary head drum assembly for scanning a video tape.

2. Description of the Prior Art

Generally, a video cassette recorder (VCR) includes a base (a main chassis or a deck), a running system installed on the base for drawing a magnetic tape from a cassette and for running the tape along a predetermined path, and a head drum assembly for recording and playing a video signal on/from the running magnetic tape.

As shown in FIG. 1, an audio signal, a video signal and an audio control signal are recorded on a magnetic tape 10. The magnetic tape is provided with an audio track 12 for recording the audio signal, a control track 14 for recording the audio control signal and a video track 16 for recording the video signal. Audio track 12 and control track 14 are formed in parallel with, and along the length of magnetic tape 10, and facing each other. Video track 16 is formed with a predetermined angle of inclination, between audio track 12 and control track 14.

VCR includes an audio head 22 for scanning audio track 12, a control head 24 for scanning control track 14, and a head drum assembly 20 having and a video head 26 for scanning video track 16. Generally, audio head 22 and control head 24 are formed in parallel with, and along the length of magnetic tape 10, and head drum assembly 20 is installed on a base (not shown) with a predetermined inclination.

Generally, head drum assembly 20 includes a plurality of video heads 26 for recording and reproducing the video signal on/from video track 16, a rotary drum 21 having a cylindrical outer wall and the plurality of video heads 26 fixed at the outer periphery of the rotary drum, a stationary drum 23 positioned on the same axial line with rotary drum 21 and under rotary drum 21, a transformer 40 positioned between rotary drum 21 and stationary drum 23, for electrically connecting the plurality of video heads 26, and a motor (not shown) for rotating rotary drum 21, as illustrated in FIG. 2.

A rotary head drum assembly disclosed in Japanese Laid-Open Publication No. 57-040133 A, which was filed on Aug. 25, 1980, is entitled "Rotary head device of VCR", was published on Mar. 6, 1982 and issued to Watanab Kazuo, and a rotary head drum assembly 60 disclosed in U.S. Pat. No. 4,535,367 issued to Shufel Kanda on Aug. 13, 1985 entitled "Magnetic record still mode reproduction apparatus and method", include two stationary drums 62.

In the head drum assembly 60 disclosed in Kanda patent, a rotary drum 64 having video head 26 is installed between the two stationary drums 62. When rotary drum 64 rotates by a motor 65, video head 26 scans a video track 16 of a magnetic tape.

However, the conventional head drum assembly 60 cannot scan audio track 12 and control track 14 of magnetic tape 10. For scanning audio track 12 and control track 14, audio head 22 and control head 24 are necessary, as described above. When installing audio head 22 and control head 24 on the base, adjusting process is needed. And for the adjusting process, a separate apparatus is required.

SUMMARY OF THE INVENTION

Accordingly, it is an object of the present invention to provide a head drum assembly for recording and reproducing a video signal, an audio signal and a control signal on/from a video tape.

To accomplish the object, there is provided in the present invention a head drum assembly of a video cassette recorder comprising:

an audio head for recording and reproducing an audio signal on/from a magnetic tape;

a control head for recording and reproducing a control signal on/from the magnetic tape;

a plurality of video heads for recording and reproducing a video signal on/from the magnetic tape;

a stationary drum having the audio head at an outer periphery thereof, with a predetermined angle of inclination;

a fixed drum having the control head at an outer periphery thereof, with a predetermined angle of inclination;

a bracket for connecting the stationary drum and the fixed drum;

a rotating rotary drum having the plurality of video heads at an outer periphery thereof, positioned between the stationary drum and the fixed drum;

a transformer for electrically connecting the plurality of video heads, and installed between the rotary drum and the fixed drum; and a motor for rotating the rotary drum.

According to the present invention, the rotary drum has a disc-shape and installed on a rotary shaft which rotates by the motor. A flange is fixed to the outer periphery of the rotary shaft, and the rotary drum is fixed to the flange. At the bottom of the rotary drum, a plurality of head bases for fixing the plurality of video heads are provided.

The stationary drum is connected with the fixed drum by the bracket. The bracket connects the outer periphery of the stationary drum with the outer periphery of the fixed drum.

According to the present invention, the audio track, the control track and the video track of the magnetic tape, can be scanned almost simultaneously by the audio head, the control head and the video head installed on the head drum assembly. Accordingly, the separate adjusting process during the installation of the audio head and the control head, is not necessary. Further, the structure of the running system of the video cassette recorder, is simple and the control thereof is advantageous.

BRIEF DESCRIPTION OF THE DRAWINGS

The above object and advantages of the present invention will become more apparent by describing in detail preferred embodiments thereof with reference to the attached drawings, in which.

DETAILED DESCRIPTION OF THE INVENTION

Hereinafter, the constituting elements and the operation principles of the head drum assembly according to a preferred embodiment of the present invention will be explained in more detail with reference to the accompanying drawings.

Figure 1:
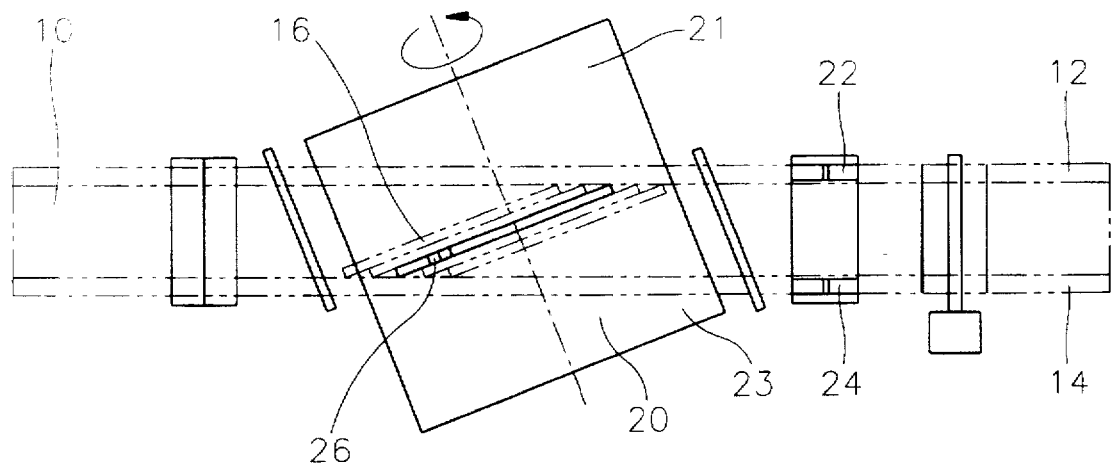
FIG. 1 is a schematic view of a running system of a conventional video cassette recorder.
Figure 3:
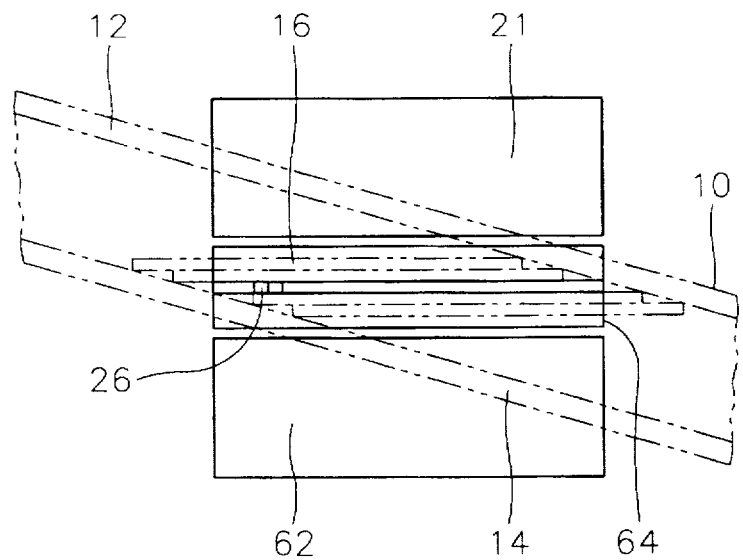
FIG. 3 is a schematic view of the conventional head drum assembly.
Figure 2:
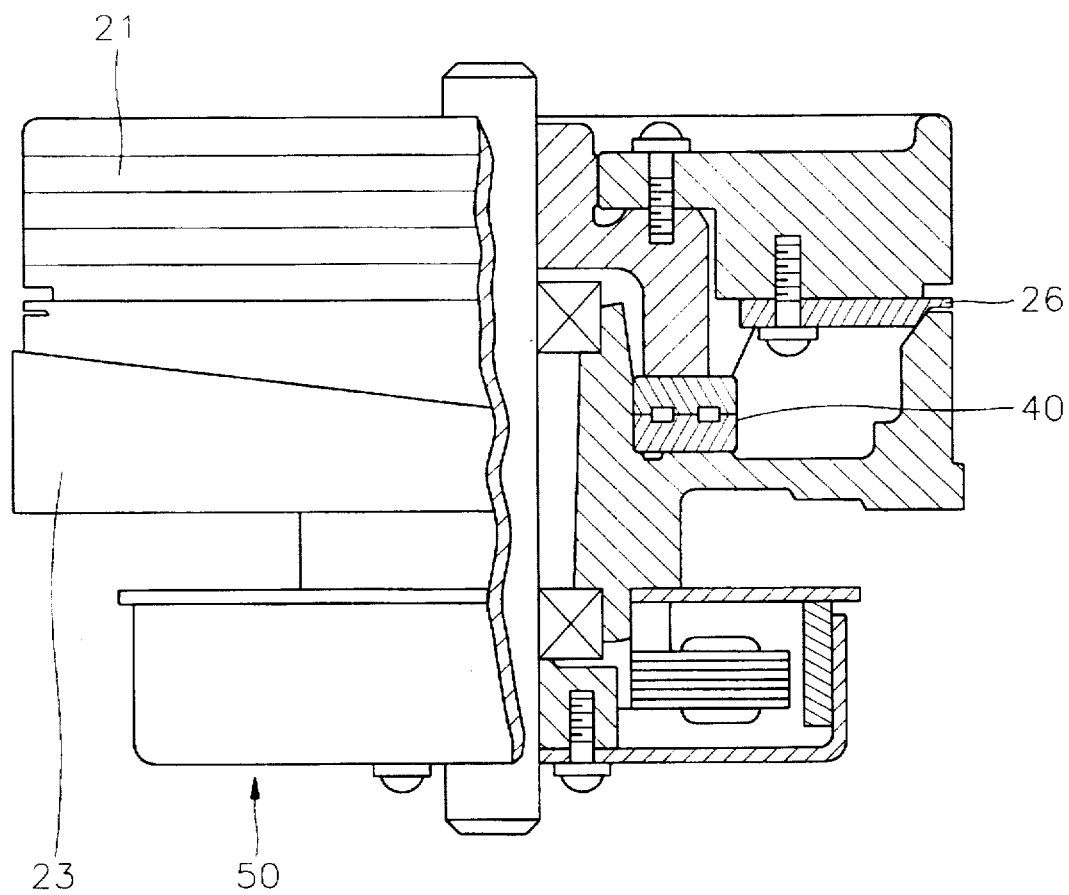
FIG. 2 is a cross-sectional view of the conventional head drum assembly.
Figure 4:
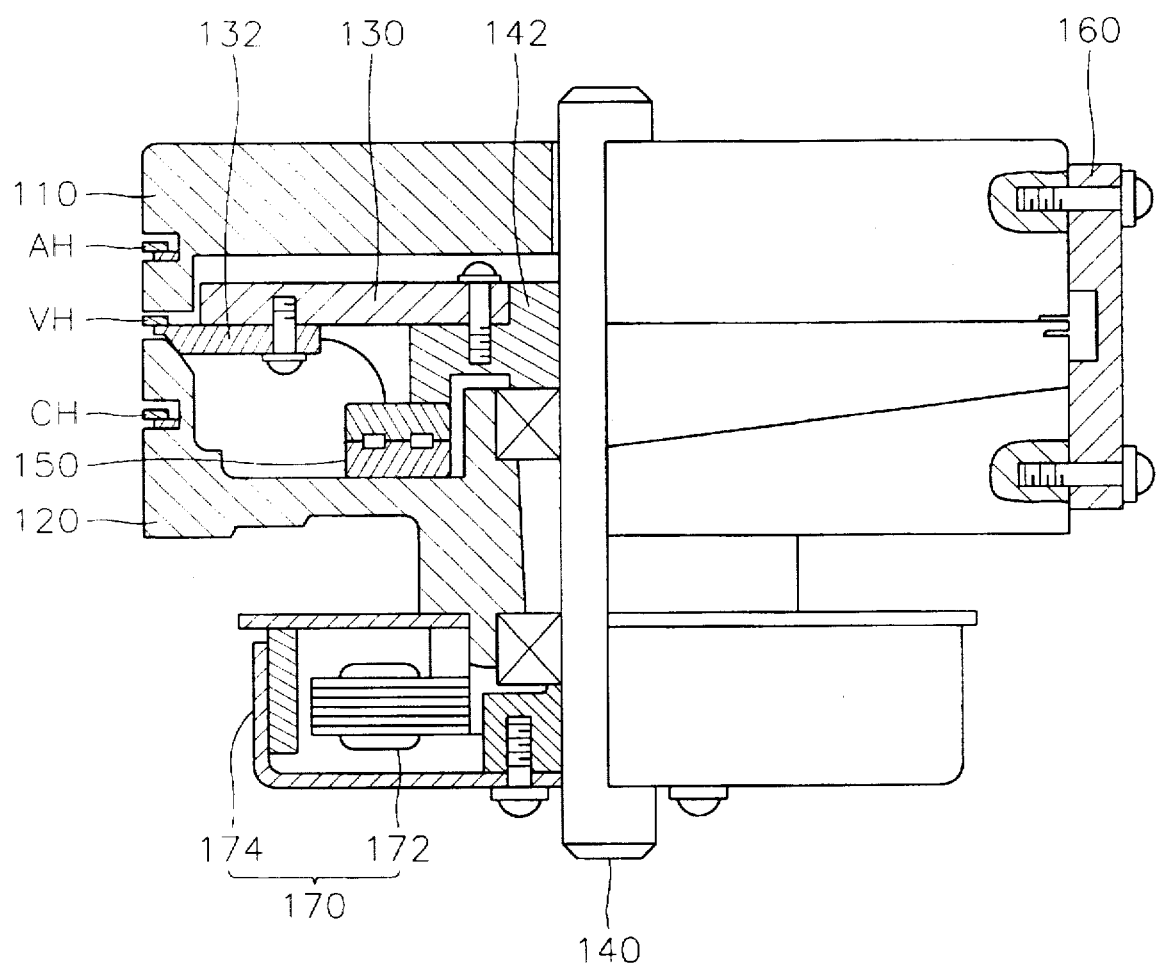
FIG. 4 is a cross-sectional view of the head drum assembly according to one embodiment of the present invention.

FIG. 4 is a cross-sectional view of a head drum assembly 100 for the video cassette recorder according to one embodiment of the present invention. As shown in the figure, head drum assembly 100 according to a preferred embodiment of the present invention includes a stationary drum 110, a fixed drum 120 fixed to a base (not shown) and a rotating rotary drum 130 installed between stationary drum 110 and fixed drum 120.

An audio head AH for recording and reproducing an audio signal on/from an audio track AT of a magnetic tape T, is installed at the outer periphery of stationary drum 110, with a predetermined angle. The audio head AH is formed along the length of the magnetic tape T when the audio head is in a stationary state, and scans the audio track AT for recording the audio signal. Stationary drum 110 has a ring-shape.

Fixed drum 120 is installed on the same axial line with stationary drum 110, has a cylindrical-shape and is fixed onto a base with a predetermined angle of inclination. At the outer periphery of fixed drum 120, a control head CH for recording and reproducing a control signal on/from a control track CT of the magnetic tape T, is installed with a predetermined angle. The stationary control head CH scans the control track CT of the magnetic tape T. The audio head AH and the control head CH maintain the same angle.

Between stationary drum 110 and fixed drum 120, rotary drum 130 is provided. At the outer periphery of rotary drum 130, a plurality of video heads VH for recording and reproducing a video signal on/from a video track VT of the magnetic tape T, are installed. The video heads VH are fixed to a head base 132 which is fixed to the bottom portion of rotary drum 130. Rotary drum 130 rotates by a rotary shaft 140 and is fixed to rotary shaft 140 through a flange 142.

At the bottom portion of flange 142 and the upper portion of fixed drum 120, a transformer 150 for electrically connecting the video heads VH, is installed. Transformer 150 keeps the electrical connection of video heads VH during the rotation of rotary drum 130.

Stationary drum 110 and fixed drum 120 are connected to each other by a bracket 160. Bracket 160 has a U-shaped cross-section and connects the outer periphery of stationary drum 110 with the outer periphery of fixed drum 120.

Under fixed drum 120, a motor 170 for rotating drum 130, is positioned. Motor 170 includes a stator 172 installed at the bottom portion of fixed drum 120 and a rotor 174 with a predetermined distance apart from stator 172. Rotary shaft 140 is fixed to rotor 174. When rotor 174 starts to rotate by the interaction thereof with stator 172, rotary shaft 140 and rotary drum 130 start to rotate. At this time, the video heads installed on rotary drum 130 scans the video track VT of the magnetic tape T.

The operation of the above-described head drum assembly 100 of the video cassette recorder according to the present invention will be described below.

Figure 5:
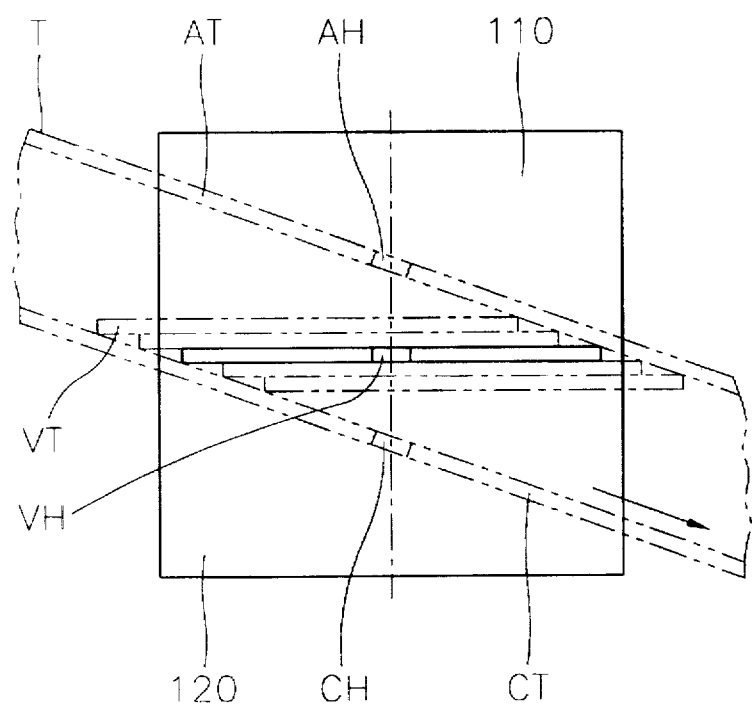
FIG. 5 is a view for explaining the scanning of a magnetic tape by a plurality of heads installed on the head drum assembly shown in FIG. 4.

First, the magnetic tape T slidably contacts with head drum assembly 100 installed on the base with a predetermined inclination, as illustrated in FIG. 5. At this time, stationary drum 110 and fixed drum 120 are in their stationary states and rotary drum 130 rotates.

When the magnetic tape T runs in a predetermined direction (in the direction as indicated by an arrow), the audio head AH and the control head CH, respectively installed on stationary drum 110 and fixed drum 120, respectively scan the audio track AT and the control track CT of the magnetic tape T. At the same time, the video heads VH installed on rotary drum 130, rotate and scan the video track VT of the magnetic tape T.

That is, when the magnetic tape T having recorded audio signal, control signal and video signal, slidably runs along head drum assembly 100, the audio track AT, the control track CT and the video track VT can be simultaneously scanned by head drum assembly 100.

As described above, the head drum assembly of the video cassette recorder according to the present invention has a simplified structure. Moreover, a separate adjusting process during the installation of the audio head and the control head, is not necessary.

Although the preferred embodiment of the invention has been described. It is understood that the present invention should not be limited to the preferred embodiment, but various changes and modifications can be made by one skilled in the art within the spirit and scope of the invention as hereinafter claimed.

What is claimed is:

1. A head drum assembly of a video cassette recorder, said head drum assembly comprising:

an audio head for recording and reproducing an audio signal on/from a magnetic tape;

a control head for recording and reproducing a control signal on/from the magnetic tape;

a plurality of video heads for recording and reproducing a video signal on/from said magnetic tape;

a stationary drum having said audio head at an outer periphery thereof, with a predetermined angle of inclination;

a fixed drum having said control head at an outer periphery thereof, with a predetermined angle of inclination;

a bracket for connecting said stationary drum with said fixed drum;

a rotary drum having said plurality of video heads at an outer periphery thereof, positioned between said stationary drum and said fixed drum, and fixed to a rotary shaft for a rotation thereof;

a transformer for electrically connecting said plurality of video heads, and installed between said rotary drum and said fixed drum; and a motor for rotating said rotary shaft.

2. A head drum assembly of a video cassette recorder as claimed in claim 1, wherein said rotary drum has a disc-shape and further comprises:

a plurality of head bases for fixing said plurality of video heads; and a flange fixed to said rotary shaft.

\* \* \* \* \*